INVENTOR
JAMES B. ROMANS

BY

ATTORNEYS 3,286,172
APPARATUS FOR DETERMINING THE DIELECTRIC CONSTANT OF LIQUIDS HAVING A DISK-SHAPED ELECTRODE LYING ABOVE THE SURFACE OF ITS SUPPORTING MEMBER
James B. Romans, 9111 Louis Ave., Silver Spring, Md.
Filed Dec. 31, 1962, Ser. No. 248,818
2 Claims. (Cl. 324—61)

The invention described herein may be manufactured and used by or for the Government of the United States of America for governmental purposes without the payment of any royalties thereon or therefor.

This invention relates to apparatus for determining electrical characteristics of liquid dielectric materials.

An apparatus for determining the dielectric constant and loss factor of liquid dielectric materials using a method based on the fact that dielectric liquids show a characteristic variation of dielectric constant and loss factor with variation in temperature when subjected to an alternating electric field is described in U.S. Patent 2,472,814 granted June 14, 1949, to M. A. Elliott. The capacitance cell of the apparatus has an upper, plate-type, grounded electrode and a lower, disc-type ungrounded electrode of smaller diameter. The upper electrode has a circular, flat bottom wall, recess in its under surface for receiving the liquid to be tested. The lower electrode has a collar of electrical insulating material, the upper surface of which is flush with the face of the electrode and parallel to the under surface of the upper electrode. The face of the upper electrode is the flat bottom wall of the circular recess in its under surface. When assembled, the circular insulating collar of the lower electrode engages the under surface of the upper electrode to provide a cell having the electrode faces in spaced parallel relationship with the liquid to be tested held therebetween.

In operation of the apparatus of the aforesaid patent, the electrodes are connected to a measuring circuit whereby measurement of the capacitance and conductance of the liquid sample may be made. The liquid sample is cooled by cooling the electrodes to a temperature below the peak in the power factor curve. Heat is then applied to the cell to warm the cell at a predetermined rate, measurements being made of the capacitance and conductance at the beginning and at intervals during the temperature rise. During the test an alternating electric field of constant frequency is applied to the liquid from a suitable frequency source.

In the course of the development and evaluation of certain high dielectric constant liquids for capacitors in which the liquids were subjected to an alternating electric field at constant frequencies in the audio range, it was observed that the capacitance cell of the apparatus of the above patent introduced errors in capacitance and dissipation factor measurements which appeared to be a function of the magnitude of the dielectric constant of the liquids under study, the frequency at which the measurements were made and the distance between the cell electrodes. The errors appeared to be due to fringing lines of force or flux at the edge of the lower, ungrounded electrode. The error was the greater as the frequency in the audio range was the lower.

The accepted method for eliminating most of the error due to fringing in capacitance cells is to introduce a guard electrode into the system. If such a modification is not desired, part of the error due to fringing can be corrected by applying edge correction formulas. The fringing error can also be reduced by using calibrating liquids which have approximately the same dielectric constant as that of the liquid under study.

The use of a guard electrode defeats the purpose of a two element cell, namely, that it be simple in construction. Its use also requires more complicated circuitry and more manipulation by the operator. The latter factor is particularly important when measurements are being taken during changes in temperature and operating frequency.

The application of edge correction formulas is both complicated and time consuming. The amount of correction needed changes as the dielectric constant of the liquid in the cell varies and as the frequency of the electric field is altered or as the distance between the electrodes is changed.

The use of a calibrating liquid having a dielectric constant approximately that of the material being studied is impractical since only three or four liquids are available which are considered suitable for this purpose. Those of high dielectric constant are difficult to maintain at a quality suitable for use as standards.

The present invention has as an object an improved apparatus of the kind described in the aforesaid patent for determining electrical characteristics of liquid dielectric materials. It is also an object to provide an improved capacitance cell for an apparatus of the aforesaid kind with the use of which at frequencies in the low audio range, errors in the measurement of capacitance and loss factor due to fringing at the ungrounded electrode are completely or almost completely eliminated.

The above and other objects are accomplished following my invention by modifying the design of the capacitance cell of the apparatus of the aforesaid patent so that the portions of the insulator which are adjacent the circular face of the ungrounded electrode are shielded from the direct path of the lines of force between the electrodes. This may be done following my invention by extending the circular face of the ungrounded electrode so that it overlies the adjacent portions of the insulator.

The invention will be more fully understood by reference to the following description when read in conjunction with the accompanying drawing wherein like numerals denote like parts and in which.

The apparatus of the invention, in general, is similar to the apparatus described in the aforesaid Elliott patent and in many instances the construction and arrangement of parts are the same, but the design of the lower, ungrounded electrode and thereby of the capacitance cell is as described hereinafter and capable of functioning at frequencies in the audio range, more particularly at the lower audio frequencies, with elimination, wholly or almost completely, of errors in measurement of the dielectric constant and loss factor of liquid dielectric materials.

Figure 1:
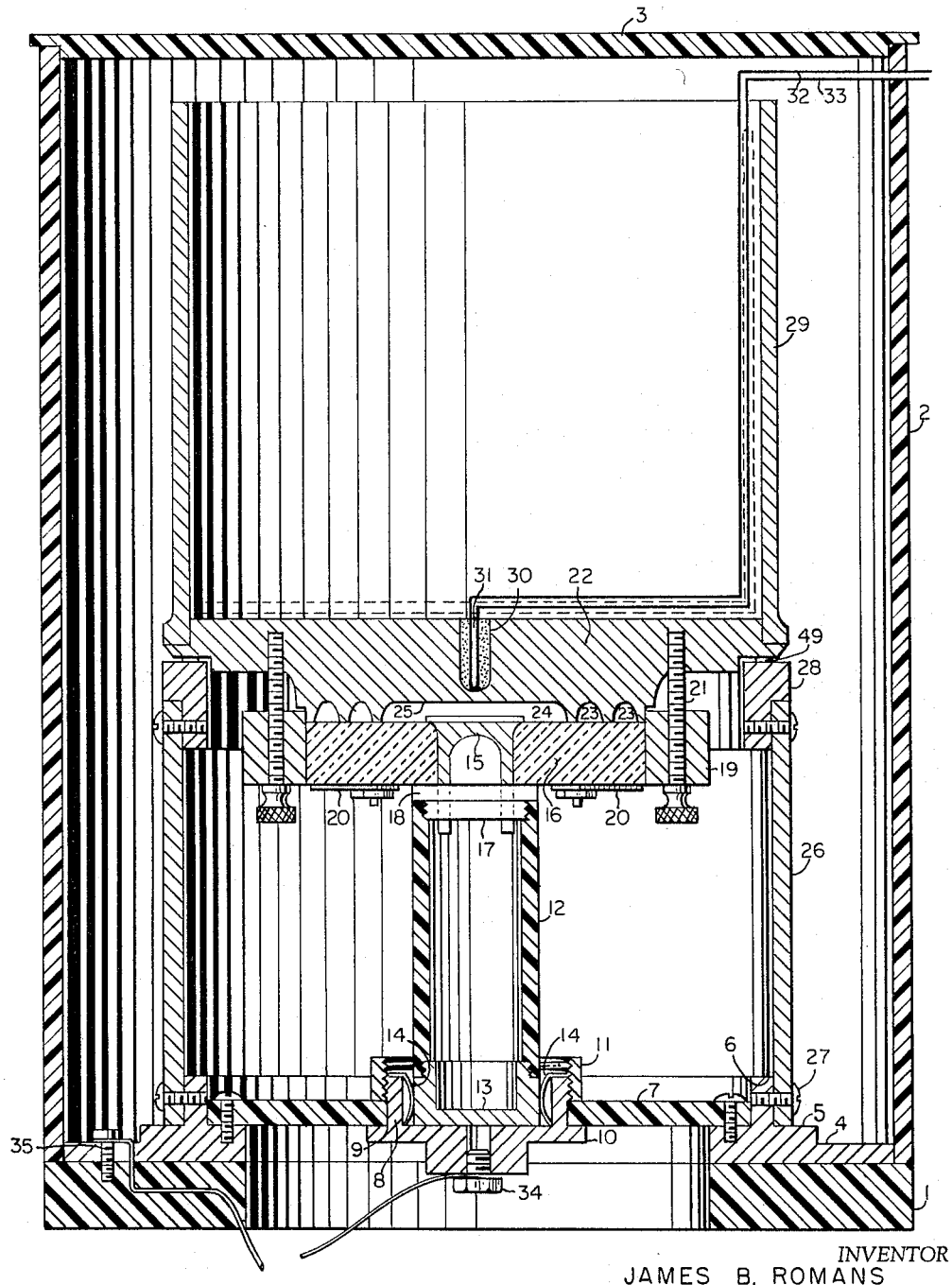
FIG. 1 is a view in section of a capacitance cell in accordance with one embodiment of the invention.

Referring to the drawing, more particularly, FIG. 1 thereof, the apparatus therein shown containing the capacitance cell and associated parts rests upon a base 1 of electrical insulating material having low electrical losses, such as polystyrene. The base may be annular in shape having a removable cover 3. The housing 2 is suitably attached to the base 1 and made of a solid thermal insulation material, such as a phenolic resin, e.g., Bakelite, to protect the apparatus against the effect of heat at room temperatures. In this respect, further protection is provided by insertion of a lining of asbestos (not shown) between the wall of the housing and the contained apparatus.

A flat annular plate 4 of electrically conductive material, such as metal, rests upon the base 1. The plate 4 has a plateau 5 which is divided into a pair of ledges by an integral upstanding ring 6. The inner ledge has seated therein and affixed thereto by a series of screws, a disc 7 of electrical insulating material, which may be of Teflon (polytetrafluoroethylene) or polystyrene. The disc 7 is made relatively thick so as to provide an adequate support for a tubular socket 8 of electrically conductive material, such as metal, which is located in the central aperture 9 of the annular disc 7. The socket 8 is retained in the aperture 9 by an integrally formed flange 10, the upper face of which bears against the under side of the disc 7, and an internally threaded collar 11 which is mounted on and threadedly engages the upper end portion of the socket 8. The collar 11 is adjusted so that its lower face bears against the upper surface of the disc 7 and thus in cooperation with the integral flange 10 rigidly fixes the socket 8 to the disc 7.

A tubular element 12 made of a low thermal conductivity material such as a phenolic resin is threadedly engaged at its lower end with the upper portion of a metal cap 13 which is adapted to be seated in the socket 8. Arcuate metal spring contact members 14 are attached to the rim of the socket 8 and extend downwardly into the socket so as to resiliently engage the metal cap 13 when it is inserted into the socket.

The lower or ungrounded electrode 15 has a collar 16 of electrical insulating material cemented thereto. As a unit, these elements are attached to the upper internally threaded end of the tubular element 12, bearing the attached metal cap 13, by means of external threading 17 on the binder nut 18 which threadedly engages the stem of the electrode. The electrode 15 and the metal cap 13 are electrically connected by a coating of conductive material, such as silver or fold (not shown), over the entire outer surface of the binder nut 18 and of the tubular support 12, down to and over the adjacent outer surface of the metal cap 13.

The lower electrode 15 and attached insulator collar 16 are seated within a ring 19 having a series of small spring metal angle brackets 20 secured to its periphery and extending radially and inwardly under the ring for a short distance to provide a resilient cradle or seat for the electrode and insulator collar. These brackets may have a lug on the upper side for contact with the under side of the insulator collar 16. The ring 19 is drilled to receive a pair of threaded bolts 21 which extend therethrough for attachment of the ring to the upper electrode as shown. This arrangement of the electrode and insulator collar in the ring 19 is the same as that described in the aforesaid Elliott patent.

The upper, grounded electrode 22 is of the plate-type and in construction may be the same as that described and shown in the aforesaid Elliott patent. The electrode 22 has a flat under surface which is interrupted by a pair of outer concentric circular grooves 23 and by an inner centrally located circular recess 24 therein. The circular recess 24 is provided with a flat bottom wall 25 which is parallel to the flat under surface of the electrode 22. Radially arranged slots are provided between the recess 24, the grooves 23 and the space outside the grooves for liquid communication therebetween, as is described and shown in the aforesaid Elliott patent. It is desirable that the whole under face of the electrode 22 be coated with an electrically conductive material, for which gold is preferable.

The upper electrode 22 is supported in position in the cell by a metal tube 26 which at its lower end is attached to the upstanding ring 6 of the metal plate 4 by means of screws 27 and at its upper end to a metal collar 28 by a detachable fastening means such as a screw. The collar 28 has several flat metal lugs 49 affixed to its upper surface. The electrode 22 has a peripheral undercut ledge by which it is seated on the collar 28 with the lugs 49 therebetween to provide space for air flow for cooling of the cell. A pair of threaded holes in the electrode 22 receive the threaded bolts 21 for securing the ring 19 thereto. The upper surface of the electrode 22 is provided with a peripheral ledge to which a metal tube 29 is welded for receiving a container of a coolant in operation of the apparatus. The position of a coolant container is shown in dotted lines.

A deep well 30 formed in the upper surface of the electrode 22 contains a thermocouple 31 which is in contact with the electrode and sealed therein against moisture. Leads 32 and 33 from the thermocouple are connected to a temperature indicator.

In setting up of the capacitance cell of the apparatus for testing, the electrode 22 is inverted and the sample of the liquid poured into the central circular recess 24. The electrode 15 with attached insulator collar 16, contained in the cradle formed by the ring 19 and angle brackets 20, is placed on the electrode 22 with the face of the insulator 16 engaging the flat surface portions of the electrode 22 which are intermediate the grooves 23 and recess 24, whereby to contain the liquid in the recess 24, except for passage of the liquid through the radially disposed slots between the recess and the grooves. The electrode 15 and insulator collar 16 are then resiliently clamped to the electrode 22 by means of the ring 19 and threaded bolts 21, the bolts being provided with knurled knobs for facilitating assembly. The lug on each of the spring metal brackets 20, which bears against the surface of the insulator disc 16, resiliently urges the insulator disc against the surface of the electrode 22 whereby to secure a tight contact between these parts.

The electrode assembly secured to the tube 12 is set in position by insertion of the metal cap 13 in the socket 8 and locked in position by means of the threaded collar 11. The lower peripheral edge of the upper electrode 22 bears on the metal lugs 49 affixed to the upper edge of the metal collar 28 whereby the weight of the assembly is largely carried by the collar 28 which insures good electrical contact.

Assembled for operation, with the apparatus contained in the housing 2, the electrode assembly or capacitance cell is electrically connected to a suitable capacitance measuring unit, with one lead therefrom being connected to the terminal 34 for the ungrounded electrode 15 and the other lead therefrom connected to the terminal 35 for the grounded electrode 22.

A suitable capacitance measuring unit for conducting measurements of liquid dielectrics at audio frequencies is a General Radio 716–C Schering bridge. This unit is contained in a conventional type circuit as shown in the aforesaid Elliott patent with an audio frequency oscillator, amplifier and oscilloscope and is connected to the electrodes of the capacitance cell of the apparatus through the terminals 34 and 35. The audio oscillator is connected at one side to the input of the measuring unit to supply the desired audio frequency field to the electrodes of the capacitance cell and on the other side to one pair of the deflecting plates of the oscilloscope. The amplifier is connected at one side to the signal output of the measuring unit and on the other side to the other pair of deflecting plates of the oscilloscope. By so connecting the audio oscillator and amplifier to the deflecting plates of the oscilloscope, a straight line pattern is obtained on the oscilloscope screen when the bridge is balanced.

The ungrounded electrode and attached insulating collar in the apparatus of the invention may be of several forms of construction as hereinafter more particularly described. As to all forms of their construction they are made of materials of very low coefficient of thermal expansion. Quartz as the material for the insulating collar and either Invar and Nilvar as the metal for the electrode are satisfactory. The electrode and the aperture in the insulating collar are shaped to a close fit and cemented together to give a liquid-tight connection therebetween. The stem of the electrode is made hollow to lower heat transfer to or from the electrode.

Figure 2:
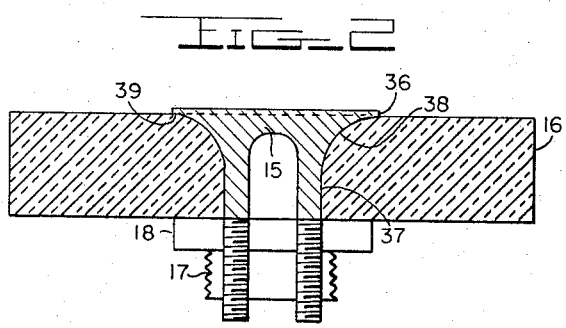
FIG. 2 is an enlarged view in section of the form of the ungrounded electrode in accordance with the invention as shown in FIG. 1.

Referring to FIG. 2, the electrode 15 and the disc-shaped insulator collar 16 of FIG. 1 are shown in enlarged cross-section. The electrode 15 has a disc-shaped head 36 on and overhanging a hollow stem 37 of smaller diameter which is provided with a fillet 38 which in maximum diameter is slightly less than that of the head, as is shown at 39. The head 36 of the electrode also lies above the upper surface of the insulator 16. By this form of construction of the electrode, in which the head 36 overlies and is above adjacent portions of the insulator 16, with a free peripheral edge portion beyond the point 39, lines of force are prevented from being refracted by the insulator material near the edge of the face of the electrode on passing from the insulated (ungrounded) electrode to the grounded electrode, the effect of which is elimination of errors in measurement of the capacitance and loss factor of liquid dielectrics at audio frequencies in the lower range of 60 to 100 c.p.s.

Figure 3:
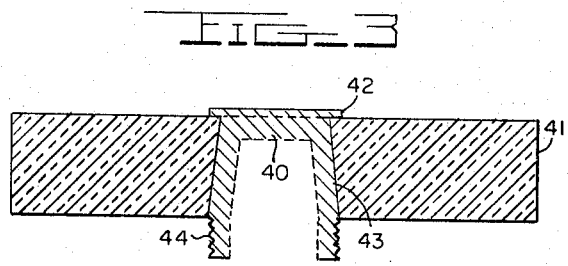
FIG. 3 is a like view of a modified form of the ungrounded electrode in accordance with the invention.

In FIG. 3, the construction of the electrode 40 is similar to that shown in FIG. 2 in that the disc-shaped head 42 is on and overhangs a hollow stem 43 of smaller diameter and overlies the adjacent portions of the disc-shaped insulator collar 41 and is above the upper surface of the collar. The electrode 40 differs from that of FIG. 2 in that no fillet is provided on the stem 43 to the head 42. The stem is threaded at 44 for connection to the tube 12 in assembly of the apparatus. This form of the electrode functions similarly and equally to the electrode of FIG. 2 in eliminating error in measurements of capacitance and loss factor of liquids due to fringing at the edge of the electrode.

Figure 4:
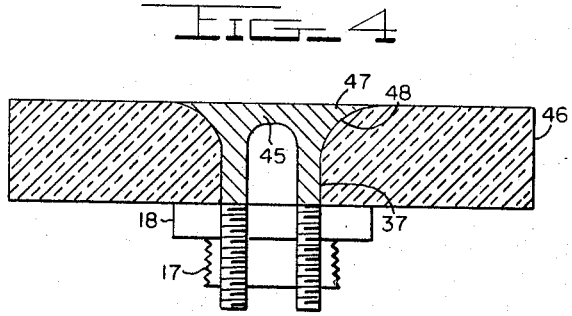
FIG. 4 is a like view of a further modified form of the ungrounded electrode in accordance with the invention.

FIG. 4 shows an electrode 45 and insulating collar 46 alike in construction to the design of these elements as shown in FIG. 2 with the exception that the head 47 of the electrode is flush with the upper surface of the insulator collar 46 and the fillet 48 in knife-edge thickness terminates at the periphery of the electrode. This form of the electrode retains the advantage of the flat (flush) surface of the assembly of the electrode and insulator collar of the apparatus of the aforesaid Elliott patent and reduces errors in measurement due to fringing at the edge of the ungrounded electrode by the same effect as the electrodes of FIGS 2 and 3 but not as completely so.

For the purpose of determining the dielectric constant and loss factor of liquid dielectric materials, the apparatus of the present invention is operated in the same manner as described in the aforesaid Elliott patent with the exception of the use of audio frequencies, especially in the lower range, for the applied alternating electric field.

While the invention has been described herein with reference to certain specific embodiments thereof, it may be variously practiced without departing from the spirit or scope thereof and, accordingly, it is intended that the foregoing description shall be taken by way of illustration and not in limitation except as may be required by the appended claims.

What is claimed is:

1. In an apparatus for determining electrical characteristics of dielectric liquids,
    a capacitance cell comprising an upper circular plate electrode having a flat under surface in which is means including a centrally located circular recess for containing a quantity of the liquid to be tested,
    said circular recess having a flat bottom wall,
    a lower electrode having a disc-shaped head on and overhanging a stem of smaller diameter,
    said disc-shaped head being in opposed, spaced, parallel relation to said flat bottom wall of the circular recess in the upper electrode and of substantially smaller diameter than said circular recess,
    a collar of electrical insulating material engaging the stem and under surface of said disc-shaped head of the lower electrode in liquid-tight relationship,
    said disc-shaped head lying above the upper surface of said collar of insulating material,
    and said collar of insulating material having a flat upper surface parallel to and engaging said flat under surface of the upper electrode in liquid-tight relationship on assembly of the capacitance cell.

2. In an apparatus as defined in claim 1 wherein the lower electrode has a fillet between the disc-shaped head and the stem and of a maximum diameter slightly less than that of the disc-shaped head.

References Cited by the Examiner

UNITED STATES PATENTS

| | | | |
|---|---|---|---|
| 1,608,085 | 11/1926 | Douglas | 317—249 |
| 1,714,012 | 5/1929 | Fiego | 317—249 X |
| 1,714,890 | 5/1929 | Rice | 317—249 X |
| 1,913,978 | 6/1933 | Ewen | 317—249 |
| 1,937,744 | 12/1933 | Clark | 324—65 |
| 2,164,638 | 7/1939 | Broeze | 317—249 X |
| 2,219,003 | 10/1940 | Braunschweig et al. | 317—249 |
| 2,425,868 | 8/1947 | Dillon | 317—249 X |
| 2,472,814 | 6/1949 | Elliott | 324—60 |
| 3,012,193 | 12/1961 | Breen | 324—61 |

WALTER L. CARLSON, *Primary Examiner.*

E. E. KUBASIEWICZ, *Assistant Examiner.*